United States Patent [19]

Brehm et al.

[11] Patent Number: 5,700,576
[45] Date of Patent: Dec. 23, 1997

[54] UV-CURABLE SCRATCH-RESISTANT VARNISH HAVING A THICKENER WHICH BECOMES BOUND IN THE COMPOSITION OF THE VARNISH BY POLYMERIZATION

[75] Inventors: Manfred Brehm, Aschaffenburg; Rolf Neeb, Pfungstadt; Wolfgang Scharnke, Darmstadt; Volker Kerscher, Reinheim, all of Germany

[73] Assignee: Roehm GmbH Chemische Fabrik, Darmstadt, Germany

[21] Appl. No.: 609,771

[22] Filed: Mar. 4, 1996

[30] Foreign Application Priority Data

Mar. 2, 1995 [DE] Germany .................. 195 07 174.3

[51] Int. Cl.⁶ .................. C08L 33/08; C08L 33/10; C08L 81/02; B32B 27/36
[52] U.S. Cl. .................. 428/412; 428/515; 522/71; 522/74; 522/79; 522/80; 522/121; 522/142; 522/180
[58] Field of Search .................. 522/142, 121, 522/180, 71, 74, 79, 80; 428/412, 515

[56] References Cited

U.S. PATENT DOCUMENTS

| 4,016,306 | 4/1977 | Miyagawa et al. ............... 422/54 |
| 4,323,592 | 4/1982 | Sasaki et al. ............... 427/54.1 |
| 4,339,474 | 7/1982 | Kishida et al. ............... 427/54.1 |
| 4,803,026 | 2/1989 | Ikeda et al. ............... 264/216 |
| 5,180,756 | 1/1993 | Rehmer et al. ............... 522/35 |
| 5,389,699 | 2/1995 | Rehmer et al. ............... 522/35 |

FOREIGN PATENT DOCUMENTS 486 278   5/1992   European Pat. Off. .

Primary Examiner—Susan W. Berman
Attorney, Agent, or Firm—Oblon, Spivak, McClelland, Maier & Neustadt, P.C.

[57] ABSTRACT

A coating agent for producing scratch-resistant coatings on plastic articles, which comprises:

(1) 1–30 wt. % of a prepolymer, as a thickener (IP thickener), which prepolymer is bound in the composition of the coating by polymerization;
(2) 20–80 wt. % of multifunctional acrylates, multifunctional methacrylates or mixtures thereof;
(3) 5–75 wt. % of a thinner;
(4) 0.01–10 wt. % of a UV-initiator;
(5) 0–20 wt. % of customary additives; wherein the prepolymer (1) is obtained by radical polymerization of:

(a) 90–99 wt. % of $C_1$–$C_8$-alkyl esters of acrylic- or methacrylic acid; and
(b) 1–10 wt. % of a sulfur-containing regulator having at least three thiol groups. The coating system is distinguished by high scratch-resistance and good weatherability.

11 Claims, No Drawings

UV-CURABLE SCRATCH-RESISTANT VARNISH HAVING A THICKENER WHICH BECOMES BOUND IN THE COMPOSITION OF THE VARNISH BY POLYMERIZATION

BACKGROUND OF THE INVENTION

1. Field of the Invention

The present invention relates to UV-curable scratch-resistant coatings for plastics, particularly scratch-resistant varnishes having thickeners which become bound in the composition of the varnish by polymerization (hereinafter referred to as "IP thickeners" for in-polymerizable thickeners) when the varnish is used.

2. Description of the Background

There is no expectation that thermoplastically deformable plastics will achieve the scratch-resistance of most metals or mineral glasses. However, a propensity to suffer scratching is particularly undesirable in articles comprised of certain plastics, such as transparent plastics, because such articles soon develop an unattractive appearance. Accordingly, numerous methods have been devised in attempts to provide such articles with scratch-resistant coatings.

Preferred coating materials comprise curable plastic resins. A few examples are:

(i) coatings comprising polyvinyl aldehydes (or polyesters) and a dialdehyde (e.g., U.S. Pat. No. 3,484,157);

(ii) polyurethanes (e.g., Ger. OS 26 11 782) with alkyl titanate (e.g., U.S. Pat. No. 3,700,487);

(iii) various melamine-type plastics, or melamine-polyol plastics (e.g., Brit. Pat. 1,308,697 and U.S. Pat. No. 3,862,261).

Also used for coatings are the following: acrylic resins of various types (e.g., Ger. 2,317,874), fluorinated hydrocarbons in various combinations and modifications (Du. OS 6608 316, and Ger. OSs 19 63 278 and 24 54 076), crosslinked polyalkyleneimine compounds (U.S. Pat. No. 3,766,299), and silicon compounds (particularly silicone resins) (e.g., Belg. Pat. 821,403, and U.S. Pat. Nos. 3,451, 838 and 3,707,397).

Eur. OS 180,129 A1 describes a method of coating of plastics with a scratch-resistant and anti-reflective coating comprised of acrylate- or methacrylate polymers, organo-silicon polymers, or melamine resins.

Scratch-resistant coatings commonly available commercially are comprised of a plurality of components. The matrix of the scratch-resistant coating is comprised of multifunctional acrylates, ordinarily in the amount of >60 wt. %.

Typically, the coatings are additionally comprised of so-called thickeners which become bound to the matrix by polymerization. These "IP thickeners" are generally oligomeric epoxy-, ether-, ester-, and/or urethane (meth)acrylates, or mixtures thereof. They are present in amounts up to c. 20 wt. %.

The thickeners usually have relatively high molecular weights of c. 500-10,000, compared to multifunctional acrylates, which latter as a rule have molecular weights in the range of 250-500. The primary motivation for using thickeners is to increase the viscosity of the varnish and to reduce the shrinking of the varnish which occurs during polymerization. Further, thickeners are less volatile than multifunctional acrylates, which is advantageous from the viewpoint of occupational health and from the standpoint of minimizing the evaporation of residual monomers from the polymerized varnish.

As a rule, thinners are employed to compensate for the thickening effect of the thickeners and to adjust the viscosity of the varnish to a desired value. Thinners which may be used include organic solvents and/or monofunctional compounds, e.g. compounds based on (meth)acrylates. The latter are termed "reactive thinners", because they can become bound in the composition of the varnish by polymerization, as can "IP thickeners", mentioned above Often, synergistic benefits are obtained by the combination of thickeners and thinners, e.g. good flow characteristics of the varnish.

It has long been known that oligomeric epoxy-, ether-, ester-, and/or urethane (meth)acrylates, or mixtures thereof can be used as thickeners. A timely and comprehensive review of this topic is available in, e.g., Allen et al. (Oldring, P. K. T., editor), 1991, "Chemistry and Technology of UV & EB Formulation For Coatings, inks and Paints, Vol. 2: Prepolymers and Reactive Diluents For UV & EB Curable Formulations" pub. SITA Technology Ltd., London. It has been found in practice that, in particular, epoxy-, ether-, ester-, and urethane (meth)acrylates have the disadvantage of poor long-term weatherability. Often the plastic surfaces turn yellowish or brownish after a certain period of time, or even become dull or develop cracks. These changes are particularly undesirable in the case of transparent or light-colored plastics.

Accordingly, it would be desirable to have available thickeners with better weatherability, e.g. on the level of that possessed by homo- or copolymers of alkyl (meth)acrylates. However, the use of homo- or copolymers of alkyl (meth)acrylates in coating formulations is itself accompanied by a number of problems.

One disadvantage lies in the poor solubility of alkyl (meth)acrylate polymers when mixed with other typical components in coating formulations, which results in long processing times when preparing the formulation for use.

Further, addition of even a few percent of these polymers can lead to cloudiness in the cured coating, because of the incompatibility of these polymers with the highly crosslinked matrix.

The polymer molecules tend to bond to each other, leading to nonuniform distribution ("island formation"), which is detrimental to the optical properties of the coating. If these "polymer islands" are present on the surface, stresses in the nature of scratching can lead to the islands separating from the matrix. Accordingly, the coating is no longer uniformly scratch-resistant over its entire extent.

Eur. AS 035,272 B1 describes the use of polymers based on alkyl (meth)acrylates as additives in coating formulations in order to provide scratch-resistant coatings. A principal function of these polymers is to disperse large amounts of UV-absorbers (5–35 wt. %), which otherwise (without the added polymers) could not be accomplished without adverse effects. It is stated that the maximum amount of the polymers which may be added is 8 wt. %. Above this amount, the polymers adversely affect flowability characteristics and scratch-resistance of the coatings. A need therefore continues to exist for a polymer thickener based composition which exhibits improved flowability and, when applied as a coating, exhibits improved scratch resistance.

SUMMARY OF THE INVENTION

Accordingly, one object is to provide a coating agent to provide scratch-resistant coatings for plastic articles such that weather-resistant polymers based on an alkyl acrylate or an alkyl methacrylate can be used as thickeners in formulations with the agent without resulting in cloudiness or lower scratch-resistance of the coating.

Briefly, this object and other objects of the present invention as hereinafter will become more readily apparent can be achieved by a coating agent for scratch-resistant coatings for plastic articles, which agent comprises:

(1) 1–30 wt. % of a prepolymer, as a thickener (IP thickener), which is bound into the composition of the coating by polymerization;

(2) 20–80 wt. % of multifunctional acrylates, multifunctional methacrylates or combinations thereof;

(3) 5–75 wt. % of a thinner;

(4) 0.01–10 wt. % of a UV-initiator;

(5) 0–20 wt. % of customary additives, particularly UV-absorbers; wherein the prepolymer (1) is prepared by radical polymerization of:

(a) 90–99 wt. % of $C_1$–$C_8$-alkyl esters of acrylic- or methacrylic acid; and (b) 1–10 wt. % of a sulfur-containing regulator having at least three thiol groups.

DESCRIPTION OF THE PREFERRED EMBODIMENTS

The benefit of using a sulfur-containing regulator having at least three thiol groups in the polymer is that at least one free thiol group will be available, because, for steric reasons, in the production of the polymer in a standard polymerization process, on the average only two of the thiol groups will react with the alkyl (meth)acrylates. When a coating applied in a thin layer to a plastic article is subjected to UV radiation initiated polymerization, very high radical concentrations are produced, under which conditions the free SH groups can react with the other crosslinking monomers. As a result, the polymeric thickener becomes bound in the matrix of the scratch-resistant coating by polymerization, and therefore can be used in relatively large amount without the product, after polymerization, having cloudiness or inferior scratch-resistance.

The free thiol group(s) confer(s) improved solubility to the polymer compared to pure homo- or copolymers of alkyl (meth)acrylates. The solubility reduces preparation time in the apparatus in which the coating formulation is produced. The cured, scratch-resistant coating will have improved long-term weather resistance compared to coatings produced with ordinary thickeners. An unexpected benefit is that degradation of the UV-absorbers present in the coating agent following the curing of the scratch-resistant coating proceeds much more slowly than in conventional coatings.

An embodiment of the present coating agent, denoted as a "scratch-resistant varnish", is produced by mixing the following components:

(1) 1–30 wt. % of a prepolymer, as a thickener (IP thickener);

(2) 20–80 wt. % of multifunctional acrylates and/or multifunctional methacrylates;

(3) 5–75 wt. % of a thinner;

(4) 0.01–10 wt. % of a UV-initiator; and (5) 0–20 wt. % of customary additives, particularly UV-absorbers.

PREPOLYMER AS A THICKENER (IP THICKENER)

An essential feature of the invention is the prepolymer which can become bound to components of the coating by polymerization (hereinafter, "IP prepolymers"). They can be produced in known fashion by radical polymerization of commercially available sulfur-containing regulators comprising $C_1$–$C_8$-alkyl esters of acrylic- or methacrylic acid, which contain at least three thiol groups per molecule. The amount of the prepolymer used in coating agents is in the range 1–30 wt. %.

Suitable examples of $C_1$–$C_8$-alkyl esters of (meth)acrylic acid include:

methyl acrylate, ethyl acrylate, propyl acrylate, isopropyl acrylate, n-butyl acrylate, isobutyl acrylate, n-hexyl acrylate and 2-ethylhexyl acrylate, methyl methacrylate, ethyl methacrylate, n-propyl methacrylate, and butyl methacrylate. Preferred monomers are methyl methacrylate and n-butyl acrylate.

Sulfur-containing regulators having more than two thiol groups in the molecule are known, as described in U.S. Pat. No. 4,521,567. Sulfur-containing regulators containing at least three and preferably four thiol groups in the molecule are employed in the present invention. They contain at least 3 and preferably at least 6 C atoms in the molecule, but not over 40 C atoms. It is advantageous if one or preferably a plurality of α-mercaptocarboxylic acid ester groups is/are present in the molecule, preferably based on polyols such as glycerin or pentaerythritol. Suitable sulfur-containing regulators with more than three thiol groups include 1,2,6-hexanetriol trithioglycolate, 2,2-di(hydroxymethyl)-1-propanol tris(2-mercaptoacetate), pentaerythritol tetrakis(2-mercaptoacetate), 2,2-di(hydroxymethyl)-1-propanol tris(3-mercaptopropanoate), pentaerythritol tetrakis(3-mercaptopropanoate), 2,2-di(hydroxymethyl)-1-butanol tris(3-mercaptoacetate), 2,2-di(hydroxymethyl)-1-butanol tris(3-mercaptopropanoate), 1,1,1-propanetriyl tris(2-mercaptoacetate), 1,1,1-propanetriyl tris(3-mercaptopropanoate), and dipentaerythritol hexakis(3-mercaptopropanoate). Particularly preferred is pentaerythritol tetrakis(2-mercaptoacetate).

In the manufacture of the thickener polymer, the ratio of the amount of regulators to the amount of monomers may be varied. The preferred monomer amounts are methyl methacrylate 50–99 wt. %, butyl methacrylate 5–40 wt. %, and acrylate [sic] 2–50 wt. %.

The regulators may be used in concentrations of 1–20 wt. %, advantageously 2–6 wt. %. A particularly suitable regulator is pentaerythritol tetrakis(2-mercaptoacetate).

The polymerizations of the regulators and monomers may be carried out by mass or suspension-, bead-, solution-, or emulsion polymerization, with the aid of radical initiators. A suitable method of bead polymerization (polymerization Step A) is disclosed in Ger. Pat. 3,329,765 C2 (and U.S. Pat. No. 4,521,567). This method may be employed as disclosed or a modification of the method can be used.

Suitable radical initiators which might be used include peroxides and azo compounds (U.S. Pat. No. 2,471,959). Suitable organic peroxides include dibenzoyl peroxide and lauryl peroxide, and peresters such as tert-butyl per-2-ethylhexyl hexanoate. Also, azo compounds such as azobisisobutyronitrile can be found.

The resulting thickener polymers may have molecular weights of c. 2,000–50,000, depending on the polymerization process and the proportion of regulators. It is assumed that steric hindrance is the reason why only two of the thiol groups of the regulator react in the preparation of the coating agent. The remaining SH group(s) can react with the other components of the composition during the subsequent UV-initiated radical polymerization of the coating agent, during which process the radical concentrations produced are much higher than those present during the production of the thickeners. With this scheme, the thickener molecules can be covalently bonded into the coating matrix.

MULTIFUNCTIONAL ACRYLATES AND METHACRYLATES AS CROSSLINKING AGENTS

The crosslinking monomers are comprised of at least two polymerizable units, e.g. vinyl groups per molecule (see Brandrup and Immerqut, "Polymer Handbook"). They may be used in amounts of 40–80 wt. %, preferably 50–70 wt. %.

Suitable crosslinking monomers include diesters and higher esters of (meth)acrylic acid with polyhydric alcohols such as ethylene glycol, glycerin, 2,2-di(hydroxymethyl)-1-propanol, 2,2-di(hydroxymethyl)-1-butanol, pentaerythritol, diglycerin, dihydroxymethylpropane, di[2,2-di-(hydroxymethyl)-1-propanol], dipentaerythritol, trimethyl-1,6-hexanediol, and 1,4-cyclohexanediol. Examples of crosslinking monomers include ethylene glycol di(meth)acrylate, propylene glycol di(meth)acrylate, 1,3-butanediol di(meth)acrylate, neopentyl glycol di(meth)acrylate, diethylene glycol di(meth)acrylate, 4-thioheptanol 2,6-di(meth)acrylate, tetraethylene glycol di(meth)acrylate, pentanediol di(meth)acrylate, hexanediol di(meth)acrylate, 2,2-di-(hydroxymethyl)-1-butanol tri(meth)acrylate, di[2,2-di-(hydroxymethyl)-1-butanol] tetra(meth)acrylate, dipentaerythritol hexa(meth)acrylate, pentaerythritol tetraacrylate, and the like.

The multifunctional (meth)acrylates may be oligomers or polymers, and these may also contain other functional groups.

THINNERS

The thinners employed in the invention may be organic solvents and/or monofunctional reactive thinners. With the aid of the thinner(s), the viscosity of the coating agent is adjusted within the range of about 10 to about 250 mPa.sec. For coating agents which are intended to be used for flow-coating or dip-coating, lower viscosities, typically 1–20 mPa.sec. are used. Organic solvents in concentrations as high as 75 wt. % may be used with such agents. For coatings to be applied using doctor applicators or rolls, suitable viscosities are in the range 20–250 mPa.sec. The viscosities stated herein should be regarded as only guidelines, and are based on viscosity measurements at 20° C. with a rotary viscosimeter according to the procedure of DIN 53 019.

Monofunctional reactive thinners are preferred in the case of coating agents for roll application. Commonly used concentrations are in the range 5–25 wt. %. Alternatively or concurrently, organic solvents may be used as thinners.

The monofunctional reactive thinners, used in combination with the thickeners, provide good flow properties of the coating agent and thereby good processibility. The monofunctional reactive thinners have a radically polymerizable group, which, as a rule, is a vinyl group. Suitable monofunctional reactive thinners include, e.g., butyl acrylate, 2-hydroxyethyl (meth)acrylate, hydroxypropyl (meth)acrylate, 2-ethoxy(methyl)ethyl methacrylate, 2,2,3,3-tetrafluoropropyl methacrylate, methyl methacrylate, tert-butyl methacrylate, isobornyl methacrylate, and the like.

In Eur. Pat. 035,272, commonly used organic solvents for the compositions of scratch-resistant coatings are described which can be used as thinners. Suitable solvents include alcohols such as ethanol, isopropanol, n-propanol, isobutanol, n-butanol, and the like; aromatic solvents such as benzene, toluene, xylene and the like; ketones such as acetone, methyl ethyl ketone, and the like; ether compounds such as diethyl ether; and ester compounds such as ethyl acetate, n-butyl acetate, ethyl propanoate and the like. The compounds may be employed alone or in combination.

UV-INITIATORS FOR RADICAL POLYMERIZATION OF THE SCRATCH-RESISTANT COATING

The UV-initiator initiates the radical polymerization of the scratch-resistant coating. Suitable initiators are compounds which cleave when subjected to UV-radiation, such that the polymerization of the coating agent is initiated. Commonly used UV-initiators include (according to Ger. OS 29 28 512), benzoin, 2-methylbenzoin ($C_6H_5$—$C(CH_3)$(OH)—$C(O)$—$C_6H_5$), benzoin methyl (or ethyl or butyl) ether, acetoin, benzil, benzil dimethylketal, benzophenone and the like. Typical amounts of such initiators in scratch-resistant coating formulations range from 0.01 to 10 wt. %.

CUSTOMARY ADDITIVES

The term "customary additives" should be understood to mean additives customarily used in coating agents for producing scratch-resistant coatings. Such additives may be used in amounts of 0–20 wt. %. The use of such additives is not a critical feature of the invention. Examples of additives include surfactants which regulate the surface tension of the coating formulation and provide the formulation with good application properties. Silicones, such as various polymethylsiloxane silicones, may be used, according to Eur. Pat. 034,272, in concentrations of 0.0001–2 wt. %.

Another frequently used class of additives are UV-absorbers, which may be employed in concentrations of 2–20 wt. %, preferably 2–8 wt. %. Suitable UV-absorbers include hydroxybenzotriazoles (see, e.g. Eur. Pat. 247,480).

The present coating agents are suitable for producing scratch-resistant, weather-resistant coatings on molded articles which are formed of thermoplastic materials. Such articles may be comprised of, e.g., polymethyl methacrylate, polycarbonate, polystyrene, polyvinyl chloride, or ABS (acrylonitrile-butadiene-styrene copolymers). The molded plastic articles may be produced by vacuum forming, blow forming, injection molding, or extrusion. They are commonly used, e.g., as structural elements for various purposes including automobile parts, architectural components, and components of kitchen and hospital equipment. The coating agents are particularly suitable for solid, flat plates, or structures comprising two or more plates connected by web members, which plates or structures are essentially comprised of polymethyl methacrylate, e.g. are comprised of methyl methacrylate monomer units in the amount of at least 60 wt. % and possibly have copolymer components comprised of units of monomers such as, e.g., $C_1$–$C_8$-alkyl (meth)acrylates. For the fabrication of solid plates, commonly employed dimensions are in the range of 3×(500–2000)×(2000–6000) mm (thickness×width×length). So-called webbed plates may have thicknesses of 16–32 mm.

Also particularly well suited for solid, flat plates and webbed plates of multiplicity 2 or above are coating agents which are essentially comprised of polycarbonate, e.g. containing at least 60 wt. %, of units of bisphenol-A monomers, possibly along with copolymer components comprised of monomer units such as, e.g. units of other bisphenols.

With the known plastic plates comprised of polymethyl methacrylate or polycarbonate it may be advantageous to coat the plate only partially, e.g. only on one or both broad faces but not on any of the narrow lateral surfaces.

The coating agent should be applied to plastic articles in such a way that the thickness of the cured coating layer is 1–50 micron, preferably 5–30 micron. Thicknesses below 1 micron do not provide adequate weather-resistance or scratch-resistance. Thicknesses above 50 micron can lead to cracking when the coating is subjected to flexural stress. Suitable application methods include spray-coating, doctor-applicator coating, dip-coating, flow-coating, roller-coating, and the like. The present coating agents are suitable for all of the methods mentioned, particularly roller-coating, which latter method generally employs formulations with higher viscosities than do other methods. Viscosities of these higher-viscosity formulations can be readily adjusted using the described polymeric thickeners.

After the coating film is applied to the plastic article, polymerization is carried out with the aid of UV-radiation. Advantageously, the polymerization may be conducted under an inert atmosphere to exclude polymerization-inhibiting air oxygen; e.g. under an atmosphere of nitrogen. However, the use of an inert atmosphere is not a strict requirement. Ordinarily, the polymerization is carried out at temperatures below the glass temperature of the plastic article. The duration of the exposure to UV-radiation required for curing depends on the temperature, the chemical composition of the coating agent, the type and intensity of the UV-source, the distance of the source from the coating agent, and the presence or absence of an inert atmosphere. As a rule of thumb, exposure to radiation is in the order of a few seconds to several minutes. The UV-source should deliver radiation with a wavelength within the range of 150 to 400 nm, preferably with an intensity maximum in the range of 250 to 280 nm. The incident intensity should be about 50–2000 mJ/cm$^2$. The distance between the UV-source and the coating should be in the range of 100 to 200 mm.

Having generally described this invention, a further understanding can be obtained by reference to certain specific examples which are provided herein for purposes of illustration only and are not intended to be limiting unless otherwise specified.

EXAMPLE 1

Table I demonstrates the improved adhesion of embodiments of the present varnish identified as nos. 1.1–1.6 to polymethyl methacrylate, in comparison to other coating systems.

A mixture of [59–0.6(x+y)] parts 1,6-hexanediol diacrylate, [39–0.4(x+y)] parts pentaerythritol tetraacrylate, x parts of the thickener, y parts of the thinner, and 2 parts of the photoinitiator 1-(4-isopropylphenyl)-2-hydroxy-2-methylpropan-1-one was stirred until a clear solution was obtained, and then was pressure filtered using a Seitz "Tiefenfilter K 800" ("Deep Filter K 800"). Then a helical doctor applicator was used to apply the resulting agent (12 micron wet film thickness) to a polymethyl methacrylate plate (Plexiglas® 200 70 FF, supplied by Roehm GmbH, Darmstadt, Germany D-64293) which had been pre-heated to about 38° C. After 2 min had elapsed, the plate was passed under a high pressure mercury lamp ("Type F450", 120 W/cm, supplied by the firm Fusion) at a speed of 1 m/min, at a distance of 100 mm, under a nitrogen atmosphere. In this way, the coating was cured.

The adhesion following the Xeno (accelerated weathering) test was determined by the grid cut test (DIN 53 151), supplemented by an adhesive tape test using "Tesafilm 4104", with determinations at 500 hr intervals. For each elapsed time stated, the loosening or removal of the coating layer after removal of the adhesive tape was determined for each sample of the coating. (The tape test was repeated on each grid cut area. If a negative result was observed, the test was repeated with a neighboring coating area which had not been previously subjected to a tape test. Only if the second test also gave a negative result, the Xeno test was regarded as negative.)

TABLE 1

| Coating | Thickener | x [%] | Thinner | y [%] | Adhesion Rating Following Xeno Test |
|---|---|---|---|---|---|
| 1.1 | A | 1 | BuA | 15 | 4000 h |
| 1.2 | A | 2 | BuA | 15 | 4000 h |
| 1.3 | A | 10 | BuA | 15 | 5000 h |
| 1.4 | A | 10 | TPMA | 15 | 5000 h |
| 1.5 | A | 20 | BuA | 15 | 5000 h |
| 1.6 | A | 30 | BuA | 15 | 5000 h |
| 1.7 | — | 0 | | 0 | no adhesion at beginning of initial test |
| 1.8 | — | 0 | BuA | 10 | 3500 h |
| 1.9 | — | 0 | TPMA | 10 | 3000 h |
| 1.10 | B | 10 | BuA | 15 | no adhesion at beginning of initial test |
| 1.11 | B | 10 | TPMA | 15 | 2000 h |

Thickeners
A = present thickener produced by radical polymerization of 75 wt. % methyl methacrylate, 20 wt. % butyl methacrylate, and 5 wt. % pentaerythritol tetrakis (2-mercaptoacetate);
B = hexafunctional aliphatic urethane acrylate;
Thinners:
BuA = butyl acrylate;
TPMA = 2,2,3,3-tetrafluoropropyl methacrylate.

EXAMPLE 2

Table 2 shows the results of the Taber test (for scratch-resistance) and adhesion tests, for inventive coating formulations nos. 2.1–2.5, on a polycarbonate substrate, in comparison to other coating systems.

A mixture of [56–0.6(x+y)] parts 1,6-hexanediol diacrylate, [37–0.4(x+y)] parts pentaerythritol tetraacrylate, x parts of the thickener, y parts of the co-monomer, 5 parts of the UV-absorber 1,3-bis(4-benzoyl-3-hydroxyphenoxy)-2-propyl acrylate, and 2 parts of the photoinitiator 1-(4-isopropylphenyl)-2-hydroxy-2-methylpropan-1-one was stirred until a clear solution was obtained, and then was pressure filtered using a Seitz "Tiefenfilter K 800". Then a helical doctor-applicator was used to apply the resulting agent (12 micron wet film thickness) to a polycarbonate plate (Makrolon® 281, supplied by Roehm GmbH, Darmstadt, Germany D-64293). After 2 min elapsed time, the plate was passed under a high pressure mercury lamp under the same conditions described in Example 1.

The Taber test for determining the hardness and scratch-resistance (DIN 52 347 E) was conducted, and the Xeno test (DIN 53 387) was conducted. The adhesion following the Xeno test was determined as described in Example 1. The viscosities were determined with a rotary viscosimeter according to the procedure of DIN 53 019, at 20° C.

TABLE 2

| Coating | Thickener | x [%] | Thinner | y [%] | Taber Test $\tau_d$ rel | Viscosity mPa · s | Adhesion rating following Xeno test |
|---|---|---|---|---|---|---|---|
| 2.1 | A | 1 | BuA | 15 | <2 | 19.5 | 4000 h |
| 2.2 | A | 2 | BuA | 15 | <2 | 20.7 | 4000 h |
| 2.3 | A | 10 | BuA | 15 | 3.0 | 36.6 | 5000 h |

TABLE 2-continued

| Coating | Thickener | x [%] | Thinner | y [%] | Taber Test $\tau_d$ rel | Viscosity mPa·s | Adhesion rating following Xeno test |
|---|---|---|---|---|---|---|---|
| 2.4 | A | 10 | TPMA | 15 | 1.7 | 26.9 | 4000 h |
| 2.5 | A | 20 | BuA | 15 | 4.8 | 122 | 5000 h |
| 2.6 | B | 10 | TPMA | 15 | 1.9 | 33.3 | 2500 h |
| 2.7 | B | 10 | BuA | 15 | 2.7 | 21.0 | 1500 h |
| 2.8 | C | 10 | TPMA | 15 | <2 | 36.4 | 2500 h |
| 2.9 | D | 10 | TPMA | 15 | <2 | 27.2 | 2500 h |
| 2.10 | E | 10 | TPMA | 15 | <2 | 38.9 | 2000 h |
| 2.11 | — | 0 | — | 0 | 1.5 | 25.2 | 3500 h |
| 2.12 | — | 0 | BuA | 15 | 1.8 | 16.0 | 2500 h |

Thickeners:
A = present thickener produced by radical polymerization of 75 wt. % methyl methacrylate, 20 wt. % butyl methacrylate, and 5 wt. % pentaerythritol tetrakis (2-mercaptoacetate);
B = hexafunctional aliphatic urethane acrylate;
C = bifunctional epoxy-acrylate;
D = acrylated acrylic polymer;
E = trifunctional aliphatic urethane acrylate 85%, in a mixture with hexanediol diacrylate 15%;
Thinners:
BuA = butyl acrylate;
TPMA = 2,2,3,3-tetrafluoropropyl methacrylate.

EXAMPLE 3

The decrease of UV-absorber component concentration in the embodiment of the present composition identified as 2.4 in Table 3 is diminished in comparison to commonly used coating systems. The UV-curable coating is produced as described in Example 2, except that the UV-absorber used is a reaction product of methyl 3-[3-(2H-benzotriazol-2-yl)-5-tertbutyl-4-hydroxyphenyl]-propanoate and Polyethylene Glycol 300 (mean molecular weight >600). The coating formulations are applied by a doctor applicator to UV-transparent Plexiglas® GS 2458, and are cured using a Fusion F450 source as described in Example 1. The effect of the relative decrease of the content of the UV-absorber in the coating layer during a Xeno test of accelerated weathering is determined from measurements of the mean transmission values at 320 and 360 nm.

TABLE 3

| | Thickener | | Thinner | Xeno Test, % UV-Absorber 0 h = 100% | | |
|---|---|---|---|---|---|---|
| | Type | % | % | 500 h | 1000 h | 2500 h |
| 2.1 | — | 0 | — | 81 | 59 | 24 |
| 2.2 | — | 0 | 15% BuA | 63 | 44 | 18 |
| 2.3 | B | 10 | 15% BuA | 65 | 43 | 13 |
| 2.4 | A | 10 | 15% BuA | 86 | 73 | 40 |

Thickeners A and B, and thinner BuA: (Same as described in Tables 1 and 2.)

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A coating agent for producing scratch-resistant coatings on plastic articles, which comprises:

(1) 1–30 wt. % of a prepolymer, as an in-polymerizable, thickener which prepolymer is bound in the composition of the coating by polymerization;

(2) 20–80 wt. % of multifunctional acrylates, multifunctional methacrylates, or mixtures thereof;

(3) 5–75 wt. % of a thinner;

(4) 0.01–10 wt. % of an ultraviolet initiator;

(5) 0–20 wt. % of customary additives, wherein the prepolymer (1) is obtained by radical polymerization of: (a) 90–99 wt. % of $C_1$–$C_8$-alkyl esters of acrylic- or methacrylic acid; and (b) 1–10 wt. % of a sulfur-containing regulator having at least three thiol groups.

2. The coating agent according to claim 1 wherein methyl methacrylate and butyl methacrylate as monomers (a) are polymerized in the preparation of prepolymer (1).

3. The coating agent according to claim 1, wherein the sulfur-containing regulator (b) has four thiol groups in the molecule.

4. The coating agent according to claim 3, wherein the sulfur-containing regulator (b) is pentaerythritol tetrakis(2-mercaptoacetate).

5. The coating agent according to claim 1, wherein said multifunctional (meth)acrylate is ethylene glycol di(meth)acrylate, propylene glycol di(meth)acrylate, 1,3-butanediol di(meth)acrylate, neopentyl glycol di(meth)acrylate, diethylene glycol di(meth)acrylate, 4-thioheptanol 2,6-di(meth)acrylate, tetraethylene glycol di(meth)acrylate, pentanediol di(meth)acrylate, hexanediol di(meth)acrylate, 2,2-di(hydroxymethyl)-1-butanol tri(meth)acrylate, di[2,2-di(hydroxymethyl)-1-butanol] tetra(meth)acrylate, dipentaerythritol hexa(meth)acrylate, pentaerythritol tetraacrylate, and the like.

6. The coating agent according to claim 1, wherein said sulfur containing regulator (b) is a member selected from the group consisting of 1,2,6-hexanetriol trithioglycolate, 2,2-di(hydroxymethyl)-1-propanol tris(2-mercaptoacetate), pentaerythritol tetrakis(2-mercaptoacetate), 2,2-di(hydroxymethyl)-1-propanol tris(3-mercaptopropanoate), pentaerythritol tetrakis(3-mercaptopropanoate), 2,2-di(hydroxymethyl)-1-butanol tris(3-mercaptoacetate), 2,2-di(hydroxymethyl)-1-butanol tris(3 mercaptopropanoate), 1,1,1-propanetriyl tris(2-mercaptoacetate), 1,1,1-propanetriyl tris(3-mercaptopropanoate), and dipentaerythritol hexakis (3-mercaptopropanoate).

7. The coating agent according to claim 1, wherein said $C_1$–$C_8$-alkyl ester of (meth)acrylic acid is a member selected from the group consisting of methyl acrylate, ethyl acrylate, propyl acrylate, isopropyl acrylate, n-butyl acrylate, isobutyl acrylate, n-hexyl acrylate, 2-ethylhexyl acrylate, methyl methacrylate, ethyl methacrylate, n-propyl methacrylate, and butyl methacrylate.

8. The coating agent according to claim 1, wherein the content of thinner in the coating agent is such that the coating agent has a viscosity within the range of about 10 to about 250 mPa.sec.

9. A polymethyl methacrylate plastic plate coated at least in part with a cured coating prepared from the coating agent of claim 1.

10. A polycarbonate plastic plate coated at least in part with a cured coating prepared from the coating agent of claim 1.

11. A method of coating plastic articles comprising: coating said plastic article with the coating agent according to claim 1.

* * * * *